Nov. 28, 1950 W. E. BEATTY 2,531,497

TELEVISION VIEW FINDER

Filed April 14, 1947 2 Sheets-Sheet 1

INVENTOR.

W E Beatty

Nov. 28, 1950 W. E. BEATTY 2,531,497

TELEVISION VIEW FINDER

Filed April 14, 1947 2 Sheets-Sheet 2

INVENTOR.

W. E. Beatty

Patented Nov. 28, 1950

2,531,497

UNITED STATES PATENT OFFICE 2,531,497

TELEVISION VIEW FINDER

William E. Beatty, Los Angeles, Calif., assignor to Motoview, Inc., Carson City, Nev., a corporation Application April 14, 1947, Serial No. 741,210

10 Claims. (Cl. 178—6)

The invention relates to a television view finder and more particularly to improvements in the apparatus disclosed and claimed in copending application, Ser. No. 739,567, filed April 5, 1947, by Max O. Miller for television view finder for photographic apparatus.

In that application is disclosed an arrangement for photographing and/or televising a horse race or the like, a motion picture camera and a television camera being arranged on a carriage movable on a track along the race track. Also, means are provided for starting and stopping the camera and for controlling the movement of the carriage from a remote point. At the remote control point, the operator is provided with a television receiver energized by the above-mentioned television pickup, whereby the operator can operate the carriage and the camera to obtain the desired view of the race, the television pickup and the photographic camera having substantially the same fields of view. Also, the photographic camera may be left idle and the carriage propelled to follow the race so that it will appear on the screen of the receiver at the remote control operator, the received television current also being supplied to other television circuits. The television pickup therefore is propelled either solely for television purposes, or as a view finder for the motion picture camera. In that application, the current from the television pickup is led to the receiver through sliding contacts.

An object of the present invention is to avoid the use of the sliding contacts in the television circuit and for this purpose the invention provides on the carriage a radio beam transmitter and an antenna circuit for the receiver, with a plurality of antennae arranged along the track. A further object of the invention is to prevent the television radiant energy from extending outside of a comparatively small area in the infield of the race track, to prevent unauthorized reception of the television radio transmission at the time the races are in progress. For this purpose, the television beam transmitter on the carriage is preferably of low power and the antennae are arranged so that they are in close spaced relation to the transmitter as it passes by them. Also, the transmitter focuses a beam towards the earth adjacent the race track so as to prevent broadcasting and further reduce the likelihood that the television beam will be transmitted to other localities.

As in the prior application referred to above, the apparatus of the present invention provides both a television pickup and a motion picture camera on the carriage, and the remote control operator may render the motion picture camera idle and control the carriage from a remote point where the television receiver is located, to follow the race either for his own benefit or for the benefit of other television circuits connected to his receiving circuit; or the remote control operator may also operate the motion picture camera to photograph the race, while employing the television picture on his receiver as a television view finder or monitor to guide him in controlling the operation of the motion picture camera and the movement of the carriage.

For further details of the invention, reference may be made to the drawings wherein Fig. 1 is a perspective view of television and photographic apparatus according to the present invention.

Fig. 5 is an alternative antenna circuit employing for the most part a coaxial cable instead of the double conductor in Fig. 1.

Figures 1, 2, 3:
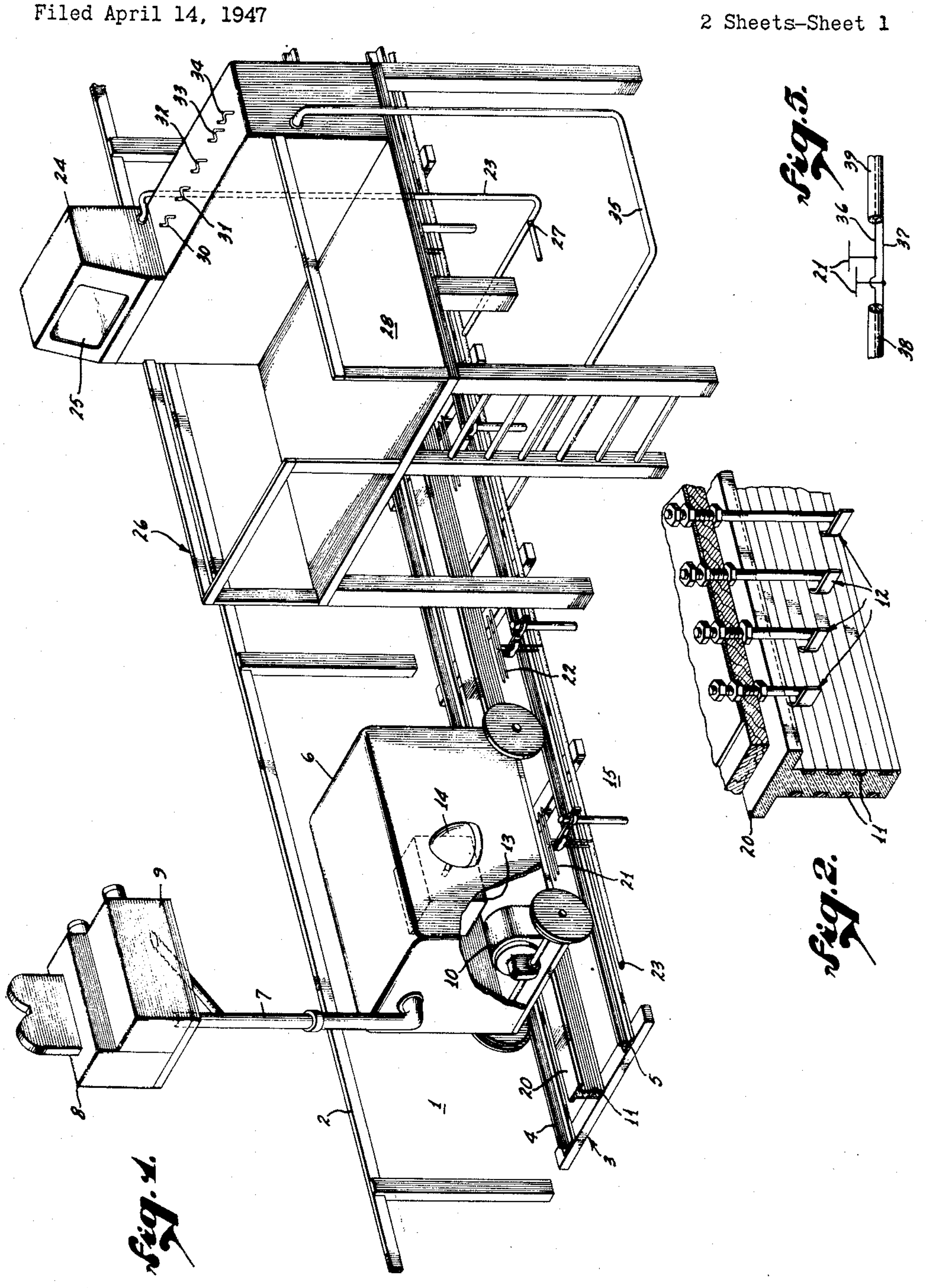
Fig. 2 is an enlarged perspective view, with parts broken away, showing the sliding contacts for the power and control circuits.
Fig. 3 is a plan view of a race track having the apparatus of Fig. 1.
Figure 3:
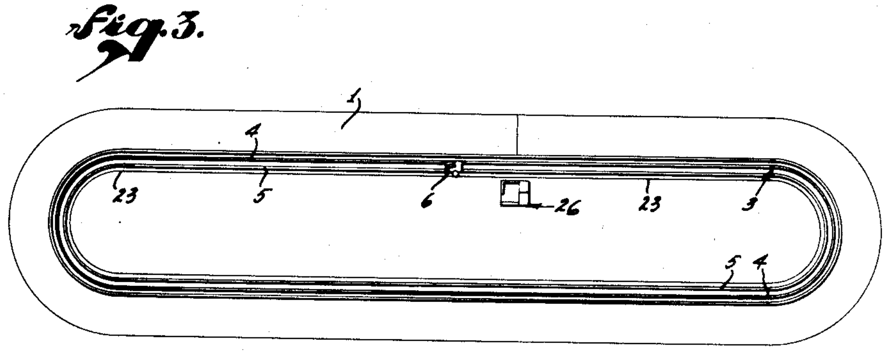

Referring in detail to the drawings, the race track 1 in Fig. 1 is on the far side of the usual rail 2. Around the race track 1 is a carriage track 3 having rails 4, 5 for a carriage 6. The rails 4 and 5 are here shown as being arranged on the ground near rail 2, although rails 4 and 5 may be elevated if desired. The carriage 6 has an elevated post 7 which supports a motion picture camera 8 and a television pickup or camera 9, both having substantially the same fields of view. The carriage 6 is driven by a motor 10. The power and control circuits for the elements 8, 9 and 10 are connected to the carriage 6 by stationary trolley wires, bus bars or electrical rails which extend along the track 3, and by two sets of sliding contacts of which one set is indicated at 12 in Fig. 2, a similar set not shown, being arranged on the opposite side of the support 20. The trolley wires 11 are shown in Fig. 2 as being arranged in two sets of four each, the sets being on opposite sides of the support 20.

The television current generated by the pickup 9 is employed to modulate a low power high frequency carrier wave in the apparatus indicated at 13 on the carriage, and the radio television wave is emitted from a beam transmitter 14 suitably supported on and fixed to the carriage 6. The transmitter 14 may be parabolic as shown, to direct the beam downwardly towards the earth in the infield indicated at 15 adjacent carriage 6. The beam is not radiated along the earth's surface to prevent unauthorized persons from tuning in on the transmission. As carriage 6 moves along its track 3, the radio beam from transmitter 14 sweeps a path along track 3 and in that path are arranged spaced receiving antennae 21, 22 connected to an antenna lead-in circuit 23 connected to a television detector and receiver 24 shown in Fig. 4. Any suitable directional transmitting antenna may be used as transmitter 14 and the beam may fan out to energize a plurality of the individual receiving antennae 21, 22 at one time, so that the reduction in signal strength due to the beam leaving one receiving antenna will be offset by the increasing signal due to the beam approaching another antenna. The antennae 21, 22 are spaced a multiple of the wave length so that the current from the various antennae 21, 22 will arrive at the circuit 23 or at receiver 24 in the same phase, not in phase opposition.

The receiver 24 demodulates the radio wave and the picture is reproduced on a screen 25 which may be on the tube as well known.

As shown in Fig. 1, receiver 24 is arranged at a remote control station 26. Other receivers like 24 may be connected to the antenna circuit 23, as indicated by the circuit 27.

The station 26 has an elevated platform 28 from which the operator can service the cameras 8 and 9 when carriage 6 is moved along its track 3 to a position adjacent the platform 28. The receiver 24 and the controls 30 to 34 are shown on platform 28 but can be located elsewhere by extending the cable 35 which connects the trolley wires 11 to the controls 30—34 and by extending the lead-in 23.

The di-pole antennae like 21, 22 may be connected to short conductors 36, 37 connected between sections 38, 39 of a coaxial cable as in Fig. 5.

Figure 4:
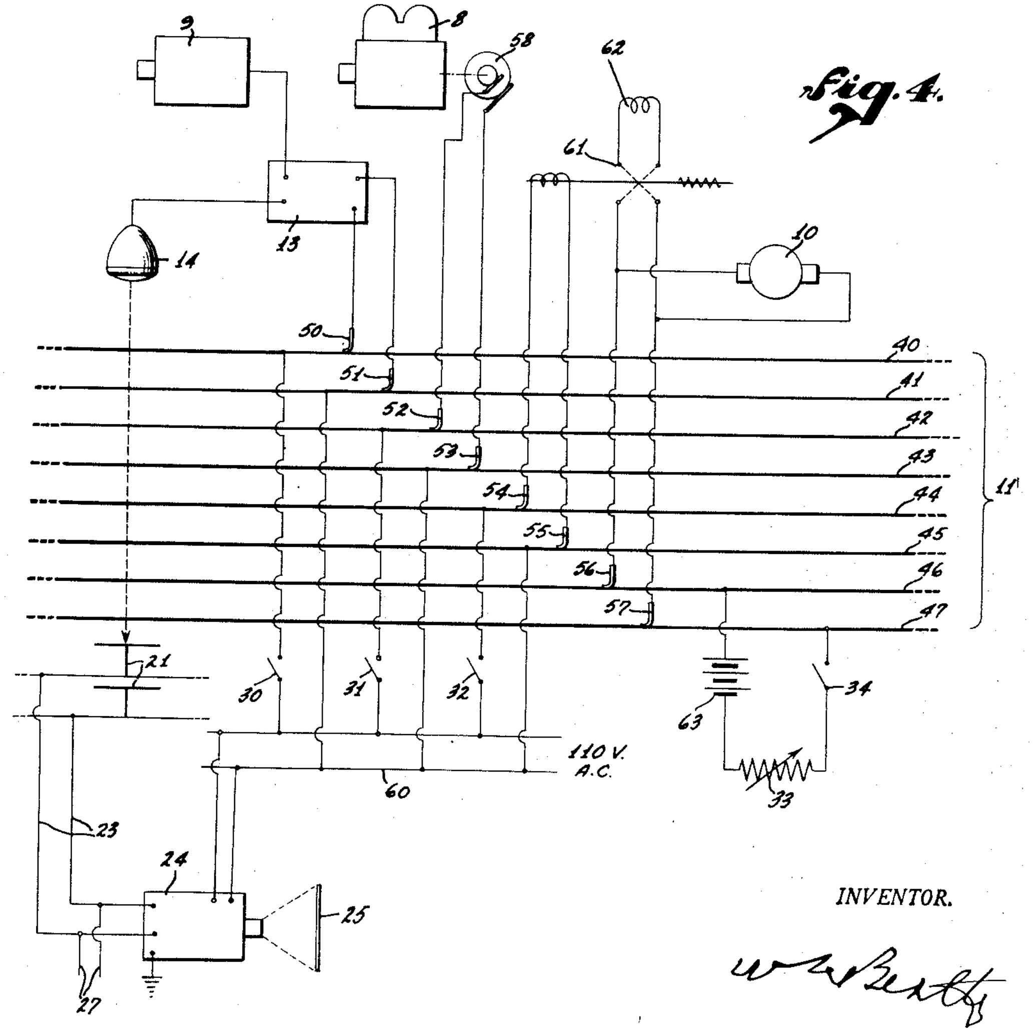
Fig. 4 is a schematic wiring diagram for the apparatus of Fig. 1.

The eight trolley wires or electric rails in the group 11 are indicated at 40—47 in Fig. 4, while their eight sliding contacts or shoes like the ones indicated at 12 in Fig. 2, are shown in Fig. 4 at 50—57.

Electrical power such as 110-volts A. C. is supplied from a suitable source here indicated at power line 60. When switch 30 is closed, power from line 60 is supplied through electrical rails 40, 41 sliding contacts 50, 51 to energize the television apparatus 9, 13. When switch 31 is closed, power from line 60 is supplied to electric rails 42, 43 sliding contacts 52, 53 to operate the motor 58 of the camera 8. When switch 32 is closed, power is supplied from line 60 to electric rails 44, 45, sliding contacts 54, 55 to operate directly or through a relay, a reversing switch 61 to reverse the field 62 of the motor 10. This reversal may be used momentarily as a brake, or continuously to reverse the direction of travel of the carriage 6. The field winding 62 of the armature of motor 10 are energized by direct current from a D. C. source 63, under control of the rheostat or speed regulator 33 and switch 34. Battery 63, with controls 33 and 34, is connected to the electric rails 46, 47 from which current is led by the sliding contacts 56, 57 to the armature of motor 10 and reversing switch 61.

The motion picture camera 8 may remain idle, with switch 31 open, and controls 33, 34 operated to propel the carriage to the proper viewpoint with respect to a race which is about to start, that position of the carriage and its camera 8 being determined by the television view finder herein provided, whereby the operator at station 26 on rendering the television apparatus 9, 13 operative by closing switch 30, will see on the screen 25 a view closely resembling the view which would be photographed in the camera 8. When the race starts, the control 33 is operated to accelerate carriage 6 and keep the race or the principal portion of it in the field of view of the television pickup 9, and also, with camera operating, if it is desired to both televise and obtain a motion picture of the race. When the race is finished, the carriage 6 is controlled to bring it adjacent platform 28 so that the operator can replace the used film with fresh film. If desired, the camera 8 may be left idle during the whole race, picture of the race as it appears on screen 25 enabling the operator at station 26 to control the movement of carriage 6 so as to obtain a desired picture of the race, for the benefit or amusement of himself or for others having receivers energized by the antenna lead-in 23. If it should be desired to broadcast the race or sporting event, the apparatus herein provided is useful as a monitor, and the television current in line 23, 27 may be fed to a broadcast transmitter.

Various modifications may be made in the invention without departing from the spirit of the following claims. For example, the beam transmitter 14 may be mounted in elevated position on the carriage 6 and or the antennae 21, 22 may be spaced some distance such as twenty or thirty feet away from the track 3 with the transmitter 14 sending its beam downwardly at an inclined angle instead of vertically as in Fig. 1.

I claim:

1. Television apparatus comprising rails, a carriage having wheels riding along said rails, means comprising a remote control for controlling the speed of said carriage, a television pick-up and a low power television radio beam transmitter therefor on said carriage, a television receiver for said transmitter local to said remote control, and an antenna circuit for said receiver, said antenna circuit having a plurality of antennae arranged in a path adjacent said rails in close receiving relation to said transmitter as it moves along said track.

2. Television apparatus according to claim 1 comprising a motion picture camera on said carriage, said television pickup and said camera having substantially the same field of view, and remote control means local to said receiver for controlling the operation of said camera.

3. Television apparatus according to claim 1 wherein said transmitter is of low power and directed earthward to follow said path, a plurality of said antennae being in receptive relation to the beam from said transmitter at one time.

4. Television apparatus according to claim 1 comprising means local to said remote control for reversing the direction of movement of said carriage.

5. Television apparatus for a race track, said apparatus comprising a carriage track having rails around said race track, a carriage having wheels riding on said rails, an elevated television camera on said carriage for televising an event on said race track, means comprising a low power beam transmitter for said television camera, means supporting said beam transmitter on said carriage in fixed position closely adjacent to the earth and directed earthward, a plurality of spaced antennae along said rails in close receptive relation to said transmitter as said carriage moves along said rails, a television receiving circuit associated with said antennae, said low power of said transmitter with said close receptive relation of said antennae substantially preventing transmission of said beam to localities other than the race track grounds, and means for propelling said carriage.

6. Television apparatus according to claim 5 comprising a remote control station having a television receiver for said receiving circuit and means at said station for controlling said propelling means.

7. Television apparatus according to claim 5 comprising a motion picture camera associated with said television camera, a remote control station having a television receiver for said receiving circuit, means at said station for controlling said propelling means, and means at said station for starting and stopping said camera.

8. Means for televising an event adjacent a carriage track having rails, said means comprising a carriage having wheels for said rails, a television camera and a low power radio transmitter therefor on said carriage, a television receiver and a lead-in circuit therefor comprising a coaxial cable extending along said track closely adjacent to the earth, a plurality of spaced antennae connected to said coaxial cable, said transmitter comprising a beam transmitter on said carriage directed earthward and supported in position on said carriage to pass over said antennae in close space relation thereto as said carriage moves around said track.

9. Means for televising an event according to claim 8 wherein said beam transmitter comprises means for energizing a plurality of said antennae at one time.

10. Means for televising an event according to claim 8 wherein said antennae are spaced substantially a multiple of the wave length of the television wave from said transmitter.

WILLIAM E. BEATTY.

REFERENCES CITED

The following references are of record in the file of this patent:

UNITED STATES PATENTS

| Number | Name | Date |
|---|---|---|
| 2,122,145 | Kear | June 28, 1938 |
| 2,166,132 | Ammen | July 18, 1939 |
| 2,269,862 | Rose | Jan. 13, 1942 |
| 2,364,357 | Halstead | Dec. 5, 1944 |
| 2,389,987 | Konrad | Nov. 27, 1945 |
| 2,407,417 | Halstead | Sept. 10, 1946 |

FOREIGN PATENTS

| Number | Country | Date |
|---|---|---|
| 504,750 | Great Britain | May 1, 1939 |

OTHER REFERENCES

Proc. IRE, June 1946, pages 375 to 401.

R. C. A. Review, September 1946, vol. VII, No. 3, pages 338 to 357.